United States Patent
Coppinger et al.

(10) Patent No.: US 7,945,808 B2
(45) Date of Patent: May 17, 2011

(54) FANOUT CONNECTIVITY STRUCTURE FOR USE IN FACILITATING PROCESSING WITHIN A PARALLEL COMPUTING ENVIRONMENT

(75) Inventors: Richard J. Coppinger, Milton, NY (US); Christophe Fagiano, Mouans-Sartoux (FR); Christophe Lombard, Saint Paul (FR); Gary J. Mincher, Rhinebeck, NY (US); Christophe Pierre Francois Quintard, Toulouse (FR); William G. Tuel, Jr., Rosendale, NY (US)

(73) Assignee: International Business Machines Corporation, Armonk, NY (US)

(*) Notice: Subject to any disclaimer, the term of this patent is extended or adjusted under 35 U.S.C. 154(b) by 268 days.

(21) Appl. No.: 12/362,660

(22) Filed: Jan. 30, 2009

(65) Prior Publication Data

US 2010/0199128 A1 Aug. 5, 2010

(51) Int. Cl.
*G06F 11/00* (2006.01)
(52) U.S. Cl. ............................................. 714/4; 714/11
(58) Field of Classification Search .......... 714/4, 11–13, 714/16, 20, 25, 19, 38–39, 47; 709/204, 709/238; 712/228

See application file for complete search history.

(56) References Cited

U.S. PATENT DOCUMENTS

| | | | |
|---|---|---|---|
| 6,401,216 B1 | 6/2002 | Meth et al. | |
| 6,718,486 B1 | 4/2004 | Roselli et al. | |
| 6,993,764 B2* | 1/2006 | Petrini et al. | 718/102 |
| 7,039,718 B2 | 5/2006 | Vertes | |
| 2005/0262411 A1 | 11/2005 | Vertes et al. | |
| 2007/0053359 A1* | 3/2007 | Wu et al. | 370/392 |
| 2007/0234295 A1 | 10/2007 | Dufour et al. | |
| 2008/0307265 A1 | 12/2008 | Vertes | |

OTHER PUBLICATIONS

Agarwal, S., et al., "Adaptive Incremental Checkpointing for Massively Parallel Systems," ISC '04, Jun. 26-Jul. 1, 2004, ACM 1-58113-839-3/04/0006, pp. 277-286.
Hacker, T., et al., "Using Queue Structures to Improve Job Reliability," HPDC '07, Jun. 25-29, 2007, ACM 978-1-59593-673-8/0810006, pp. 43-53.
Naik, V., et al., "A Checkpointing Strategy for Scalable Recovery on Distributed Parallel Systems," 1997, ACM 0-89791-985-8/9710011.
Oliner, A., et al., "Cooperative Checkpointing: A Robust Approach to Large-Scale Systems Reliability," ICS06, Jun. 28-30, ACM 1-59593-282-8/06/0006, pp. 14-23.

* cited by examiner

*Primary Examiner* — Dieu-Minh Le
(74) *Attorney, Agent, or Firm* — Justin Dillon, Esq.; Blanche E. Schiller, Esq.; Heslin Rothenberg Farley & Mesiti P.C.

(57) ABSTRACT

A hierarchical fanout connectivity infrastructure is built and used to start a parallel application within a parallel computing environment. The connectivity infrastructure is passed to a checkpoint library, which employs the infrastructure and a defined sequence of events, to perform checkpoint, restart and/or migration operations on the parallel application.

20 Claims, 11 Drawing Sheets

US 7,945,808 B2

FANOUT CONNECTIVITY STRUCTURE FOR USE IN FACILITATING PROCESSING WITHIN A PARALLEL COMPUTING ENVIRONMENT

This invention was made with Government support under Agreement No. HR0011-07-9-0002 awarded by DARPA. The Government has certain rights in the invention.

TECHNICAL FIELD

This invention relates, in general, to parallel computing environments, and in particular, to facilitating checkpoint, restart and/or migration operations within a parallel computing environment.

BACKGROUND OF THE INVENTION

In a parallel computing environment, such as a High Performance Computing environment, there are large parallel applications running on thousands of nodes. In such an environment, it may be necessary to checkpoint or restart one or more of the large parallel applications, or to at least migrate a portion of an application from one node to another node. Checkpointing is saving the state of a running application into a file such that the complete state can be restored and the application continued at a future time. Restarting is restoring the state from a checkpoint file and resuming execution in such a way that the application continues to run as if it had not been interrupted (but possibly on a different set of compute nodes). Migration includes moving portions of a running application from one or more compute nodes to one or more other compute nodes using, for instance, a checkpoint/restart mechanism, such that the user of the application does not perceive any interruption in the operation of the application, except possibly a slow down or temporary non-responsiveness.

Currently, to perform the checkpoint, restart and/or migration operations, a single master node is used to control all the compute nodes. This one node manages the thousands of connections.

SUMMARY OF THE INVENTION

The use of a master node for controlling all the compute nodes of a parallel computing environment does not scale because of the storage and CPU requirements for managing thousands of connections from a single master. Thus, in accordance with an aspect of the present invention, a hierarchical fanout connectivity or communications infrastructure is built and used, along with a specific definition of the messages and procedures employed to coordinate the infrastructure, to checkpoint, restart and/or migrate a large parallel application (a.k.a., a job).

The shortcomings of the prior art are overcome and additional advantages are provided through the provision of a computer program product for facilitating processing within a parallel computing environment. The computer program product includes a storage medium readable by at least one processing node and storing instructions for execution by the at least one processing node for performing a method. The method includes, for instance, obtaining, by a checkpoint library of the parallel computing environment, a fanout connectivity structure, the fanout connectivity structure built independent of the checkpoint library and defining a hierarchical topology of a plurality of nodes to be used in performing one or more processing operations for a parallel application executing in the parallel computing environment; and using, by the checkpoint library, at least multiple nodes of the plurality of nodes of the fanout connectivity structure and a defined sequence of events to perform one or more processing operations, wherein in performing a processing operation communication between nodes of the at least multiple nodes follows the hierarchical topology defined by the fanout connectivity structure.

Computer-implemented methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1A:
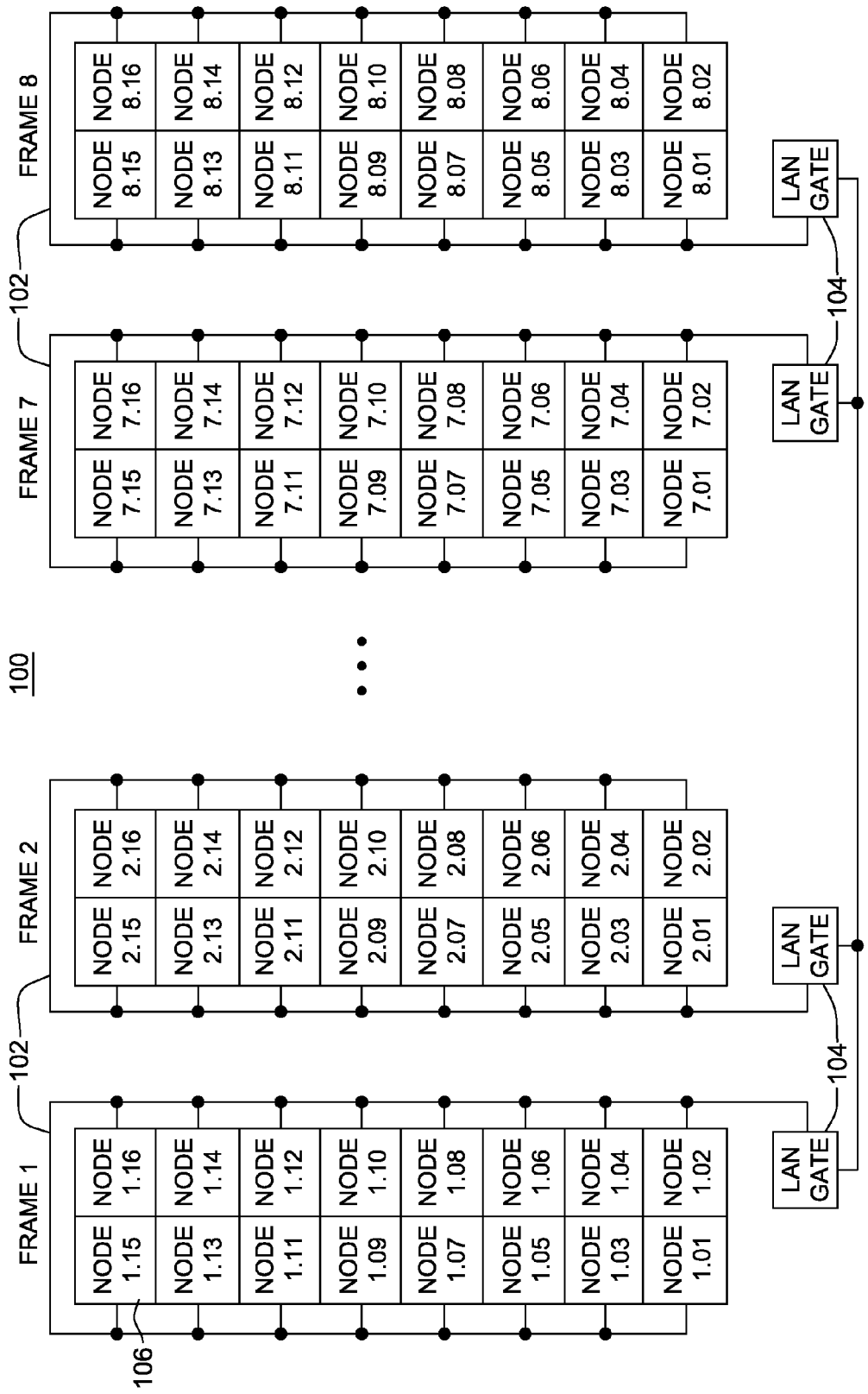
FIG. 1A depicts one example of a parallel computing environment to incorporate and use one or more aspects of the present invention.

In accordance with an aspect of the present invention, processing of parallel applications is facilitated by the use of a fanout connectivity structure. A hierarchical fanout connectivity structure is built and used to perform processing operations, such as checkpoint, restart and/or migration operations, for parallel applications. The connectivity structure is passed to a checkpoint library (e.g., one or more processes to perform one or more particular functions), which employs the structure and a carefully defined sequence of events, to perform the checkpoint, restart and/or migration operations.

As the base of the fanout structure is built, its connectivity information (e.g., the details of the topology of the structure) is passed to the checkpoint library to allow the checkpoint library to maintain the structure and to communicate over the structure. The structure is built independent of the checkpoint library and it eliminates the need for the checkpoint library to build its own connectivity structure. The sequence of events employed to checkpoint a parallel application, restart it on the same or different nodes, or to migrate a portion of a running application to a new set of nodes is carefully defined. This enables the checkpoint, restart and/or migration of large parallel applications to be feasible from a control standpoint.

One embodiment of a parallel computing environment to incorporate and use one or more aspects of the present invention is described with reference to FIG. 1A. As shown, a parallel computing environment 100 includes, for instance, a plurality of frames 102 coupled to one another via a plurality of LAN gates 104, each of which is described below.

In one example, parallel computing environment 100 includes eight (8) frames, each of which includes a plurality of processing nodes 106. In one instance, each frame includes sixteen (16) processing nodes (a.k.a., processors, compute nodes, nodes), and each processing node is, for instance, a pSeries® server offered by International Business Machines Corporation. Each processing node within a frame is coupled to the other processing nodes of the frame via, for example, an internal LAN connection. Additionally, each frame is coupled to the other frames via LAN gates 104. As examples, each LAN gate 104 includes either a pSeries® server, any computer network connection to the LAN, or a network router. However, these are only examples. It will be apparent to those skilled in the relevant art that there are other types of LAN gates, and that other mechanisms can also be used to couple the frames to one another.

The parallel computing environment of FIG. 1A is only one example. It is possible to have more or less than eight frames, or more or less than sixteen nodes per frame. Further, the processing nodes do not have to be pSeries® servers. Some or all of the processing nodes can include different types of computers. All of these variations are considered a part of the claimed invention.

Figure 1B:
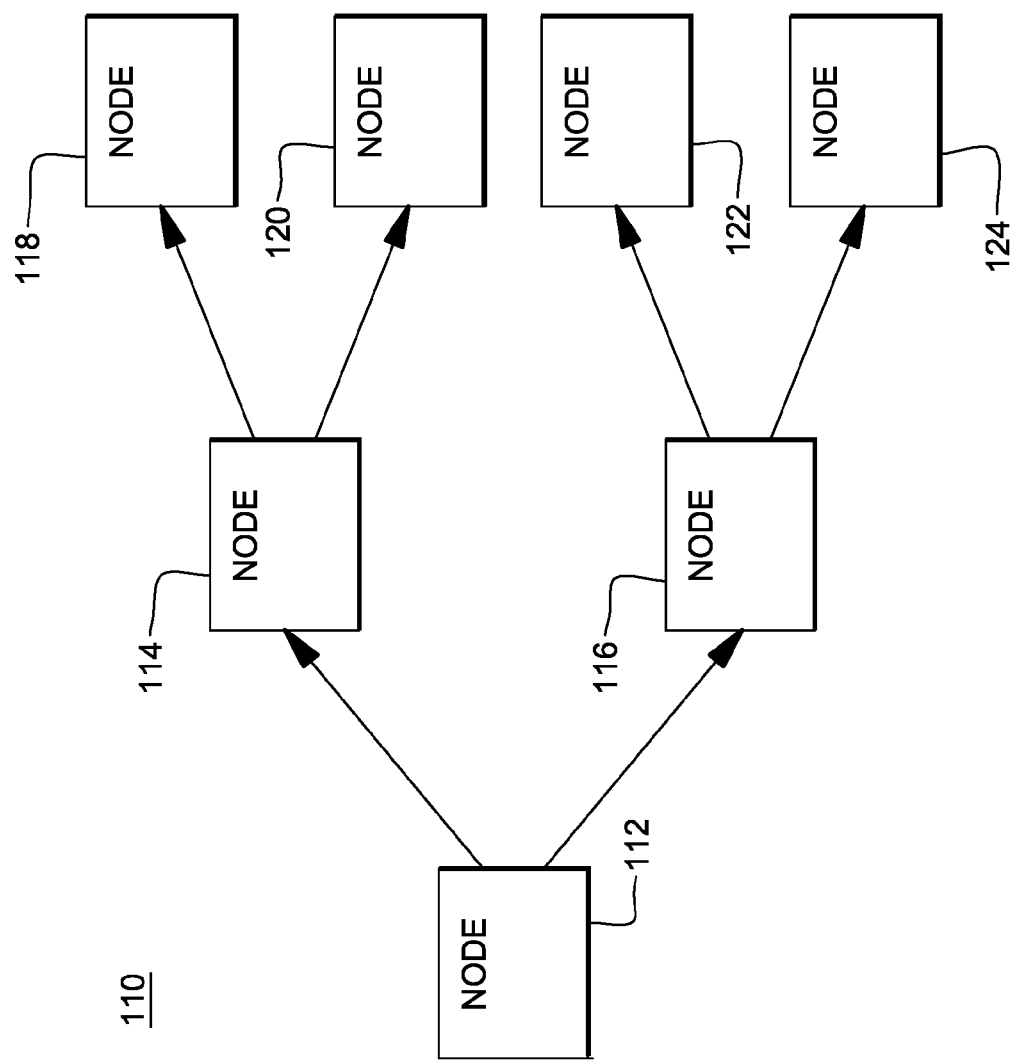
FIG. 1B depicts one example of a plurality of nodes of the parallel computing environment of FIG. 1A connected based on a hierarchical fanout connectivity structure, in accordance with an aspect of the present invention.

In one particular example, a plurality of the nodes (e.g., some or all of the nodes of the parallel computing environment) are coupled in a hierarchical fanout structure 110. As shown in FIG. 1B, a first node 112 (referred to as the home node) is connected to two nodes 114 and 116 (referred to as Level 1 (L1) nodes). Node 114 is further connected to nodes 118 and 120 (referred to as Level 2 (L2) nodes), while node 116 is further connected to nodes 122 and 124 (also referred to as Level 2 (L2) nodes). Although seven nodes are depicted in FIG. 1B, it will be understood to those skilled in the art that the parallel computing environment typically includes many more nodes, even thousands of nodes, and therefore, the hierarchical structure will also include many more nodes. This set of nodes is shown only for illustrative purposes.

Figure 1C:
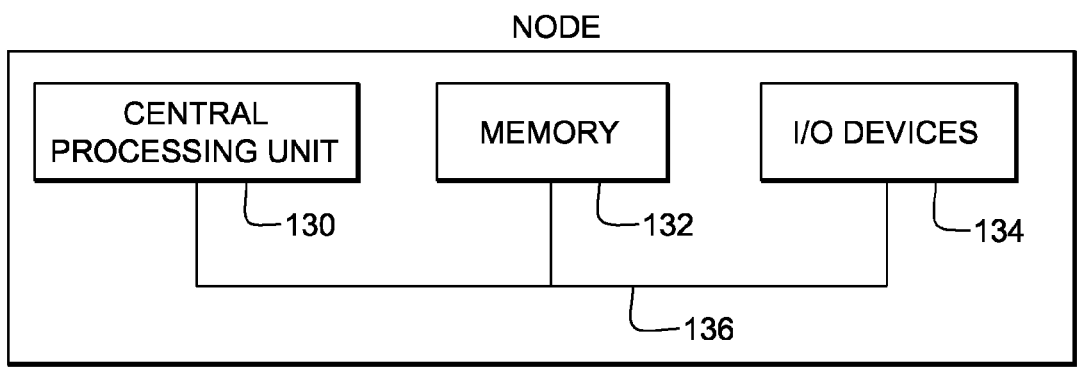
FIG. 1C depicts one embodiment of various components of a node of the hierarchical fanout structure of FIG. 1B, in accordance with an aspect of the present invention.

Referring to FIG. 1C, in one example, each node includes a central processing unit 130, a memory 132, and one or more I/O devices 134 coupled together via, for instance, one or more buses or other connections 136. As an example, the central processing unit executes an operating system, such as AIX® or Linux, offered by International Business Machines Corporation. pSeries® and AIX® are registered trademarks of International Business Machines Corporation, Armonk, N.Y. Other names used herein may be registered trademarks, trademarks or product names of International Business Machines Corporation or other companies.

A node is capable of executing both serial and parallel applications. However, it is in the context of parallel applications that the checkpoint, restart and migration capabilities of the present invention are described. A parallel application includes a plurality of processes (or tasks) that are executed independently on a plurality of nodes. In one example, the processes of a parallel application are coordinated by a coordinating process or parallel job manager. The processes of a parallel application communicate with each other by, for instance, passing messages back and forth. In one example, a message passing interface (MPI), offered by International Business Machines Corporation, is used to communicate between the various processes. MPI is described in, for instance, "IBM Parallel Environment for AIX and Linux 5.1.0: MPI Subroutine Reference", IBM Publication No. SC23-6671-00 (November 2008), which is hereby incorporated herein by reference in its entirety.

Figure 1D:
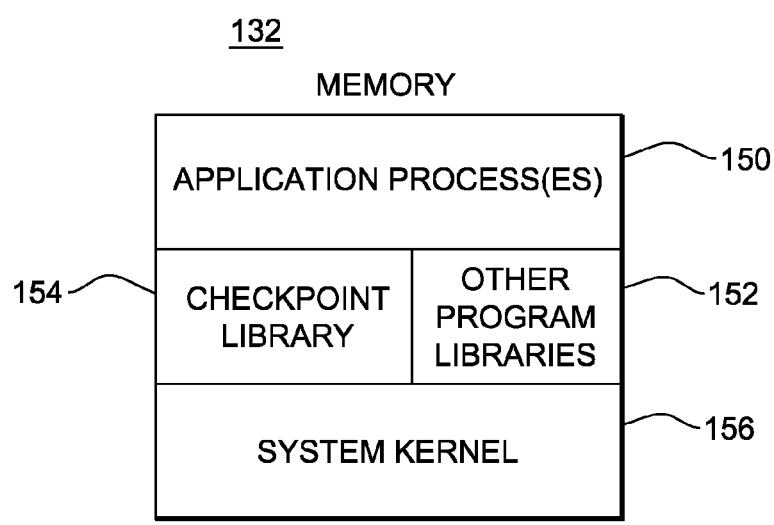
FIG. 1D depicts further details of the memory of the node of FIG. 1C, in accordance with an aspect of the present invention.

Each process of a parallel application is loaded in the memory of a node that is executing the process. This is depicted in FIG. 1D. As one example, memory 132 includes one or more application processes 150. Each process may make a library call to various program libraries 152, also loaded within the memory. One program that is called, in accordance with an aspect of the present invention, is a checkpoint library 154. Checkpoint library 154 is called by each process that is to use the checkpoint, restart and/or migration capabilities of the present invention. As used herein, a library is a process including a series of steps to perform one or more particular functions. In one example, it is a group of compiled objects that execute the particular functionality.

In addition to the above, memory 132 includes a system kernel 156, which provides various system services to the application processes and the libraries.

In accordance with an aspect of the present invention, to facilitate processing within a parallel computing environment, and in particular, to facilitate checkpoint, restart and/or migration operations for a parallel application, a fanout structure is created. This fanout structure is a connectivity or communications infrastructure that defines a hierarchical topology of a plurality of nodes used to execute parallel applications. This fanout structure enables the management associated with a parallel application to be spread across the nodes, instead of at one central location, allowing scalability of those parallel applications that include thousands of processes or nodes.

One embodiment of the logic associated with building a fanout connectivity structure (also referred to herein as a tree structure) is described with reference to FIG. 2. This logic is performed by one or more nodes of the parallel computing environment. Input to the logic includes the number of nodes to be used for the parallel application. In one example, one partition manager daemon (pmd) is spawned on each node. The pmds are used by a coordinating process, an example of which is the parallel operating environment (poe), to send messages to user processes. Poe and pmd are offered by International Business Machines Corporation and are described in detail in, for instance, "IBM Parallel Environment For AIX and Linux 5.1.0: Operation and Use," IBM Publication No. SC23-6667-00 (November 2008), which is hereby incorporated herein by reference in its entirety. Also input to the logic is the number of hops or pmd levels (default is 2, if not specified). If possible, each branch of the tree has an equal number of nodes.

Figure 2:
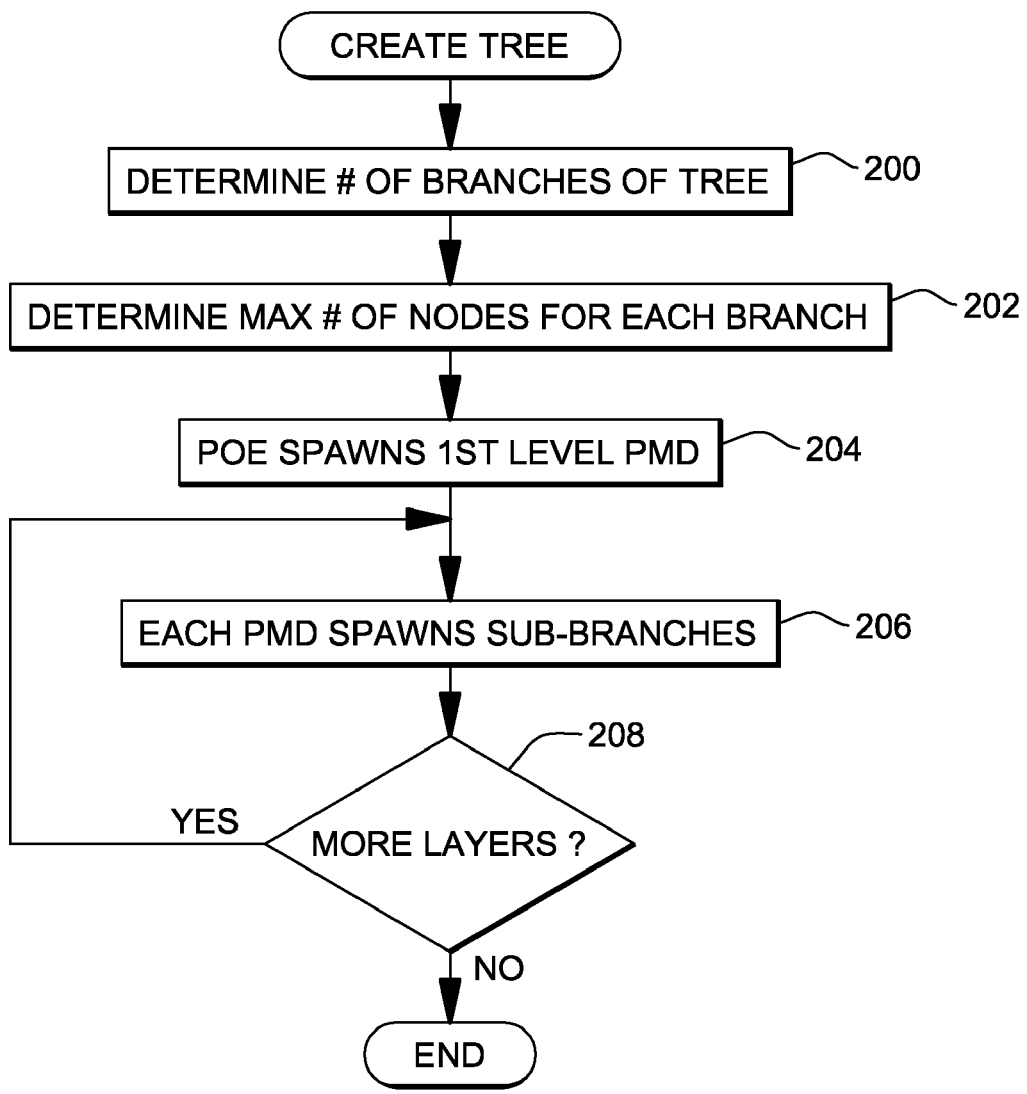
FIG. 2 depicts one embodiment of the logic associated with creating a hierarchical connectivity structure used in accordance with an aspect of the present invention.

Referring to FIG. 2, in one example, to form the tree, the number of branches of the tree is determined, STEP 200. To determine the number of branches, the hops root (e.g., 3 hops, cubic root; 2 hops, squared root, etc.) of the nodes is taken, and the result is rounded to the next highest integer. Then, the nodes are divided by the number of branches, and the result is rounded to the next highest integer. This is the maximum number of nodes (pmds) for each branch, STEP 202.

The first level pmds are spawned by the parallel operating environment, STEP 204, and each pmd spawns the same number of sub-branches as poe, STEP 206. This distribution is maintained until reaching the last layer, INQUIRY 208, where the remaining nodes up to the branch maximum minus the already spawned pmds is evenly distributed.

As an example, assume there are 48 nodes and three hops. According to the logic above, the cubic root of 48 is 3.64, which means that the tree will have four branches. Therefore, the parallel operating environment spawns four pmds and the first level pmds each spawn four other pmds. As a result, the first two layers count for twenty nodes and the last layer has 38 nodes or 7 pmds for each final branch. That means three of the second layer pmds in each branch spawn two other pmds, and one spawns just one.

The fanout structure is built and used during a startup phase. During startup, a parallel job manager (e.g., poe) determines the fanout structure and invokes parallel job manager agents (e.g., remote processes; pmds) on the nodes to which it is to be directly connected (e.g., parallel job manager on node 112 invokes parallel job manager agents on nodes 114, 116). The parallel job manager informs each parallel job manager agent that it starts as to one or more parallel job manager agents that it is to start, if any (e.g., the agent on node 114 starts agents on nodes 118 and 120; and the agent on node 116 starts agents on nodes 122 and 124). Each parallel job manager agent starts its parallel job manager agents and tells them the agents that they are to start, if any. This continues until all the agents of the connectivity structure are started. Each parallel job manager and agent passes to the checkpoint library its relative position in the fanout hierarchy, enabling the processes of the checkpoint library to interact using the same hierarchy. The checkpoint library initializes itself and prepares for communications employed during checkpoint, restart and migration using that same hierarchy. Further details regarding startup are described below.

In one particular example, the functionality provided herein by the fanout connectivity structure extends the functionality provided by the AIX® WPAR checkpoint/restart mechanism offered by International Business Machines Corporation to provide a distributed checkpoint/restart facility. One example of AIX® WPAR is described in "Introduction to Workload Partition Management in IBM AIX Version 6.1," IBM Publication No. SG24-7431-00 (November 2007), which is hereby incorporated herein by reference in its entirety. The distributed checkpoint/restart support includes mdcr (distributed checkpoint/restart), which runs on the home node (e.g., node 112), and agents of mdcr, referred to as mdcrs (distributed checkpoint/restart subordinate), which run on the other nodes and serve as parents of the containers in the application. A container is used herein to mean a checkpointable unit, i.e., a set of computer processes that are to be checkpointed.

Mdcr (a.k.a., the checkpoint library) is available either as a library, named libmdcr, or a binary, named mdcr. This component receives the commands from the user and coordinates the mdcrs. Mdcrs, the helper (a.k.a., the checkpoint agent), is available either as a library, named libmdcrs, or a binary, named mdcrs. This component is used to create the container.

All the processes of the application that are to be included within the container are launched through mdcrs (or libmdcrs).

The mdcr functions are called by poe. Specifically, in one embodiment, an unvirtualized poe (upoe) calls mdcr and mdcrs. An unvirtualized poe is a poe outside of a container, while a virtualized poe (vpoe) is a poe within a container. The upoe calls the mdcr functions (in libmdcr) and the mdcrs function (in libmdcrs). Vpoe is started through mdcrs into a container. Through xinetd (inetd for AIX®), upoe starts the different upmd (unvirtualized pmd) located on the remote nodes. In a specific order, upoe and upmd start vpoe and vpmd (virtualized pmd). Vpoe and vpmd communicate together; the vpmds start the application instances (tasks). An execute process is engaged when upoe and upmd invoke an mdcr(s) _execute function located in the libraries, libmdcr/libmdcrs.

One embodiment of the startup sequence is described with reference to FIG. 3. In one example, this logic is executed by one or more of the nodes of the parallel computing environment. Although this logic and other logic described below is described with reference to mdcr and its components, it will be understood that one or more aspects of the present invention are usable without mdcr.

Figure 3:
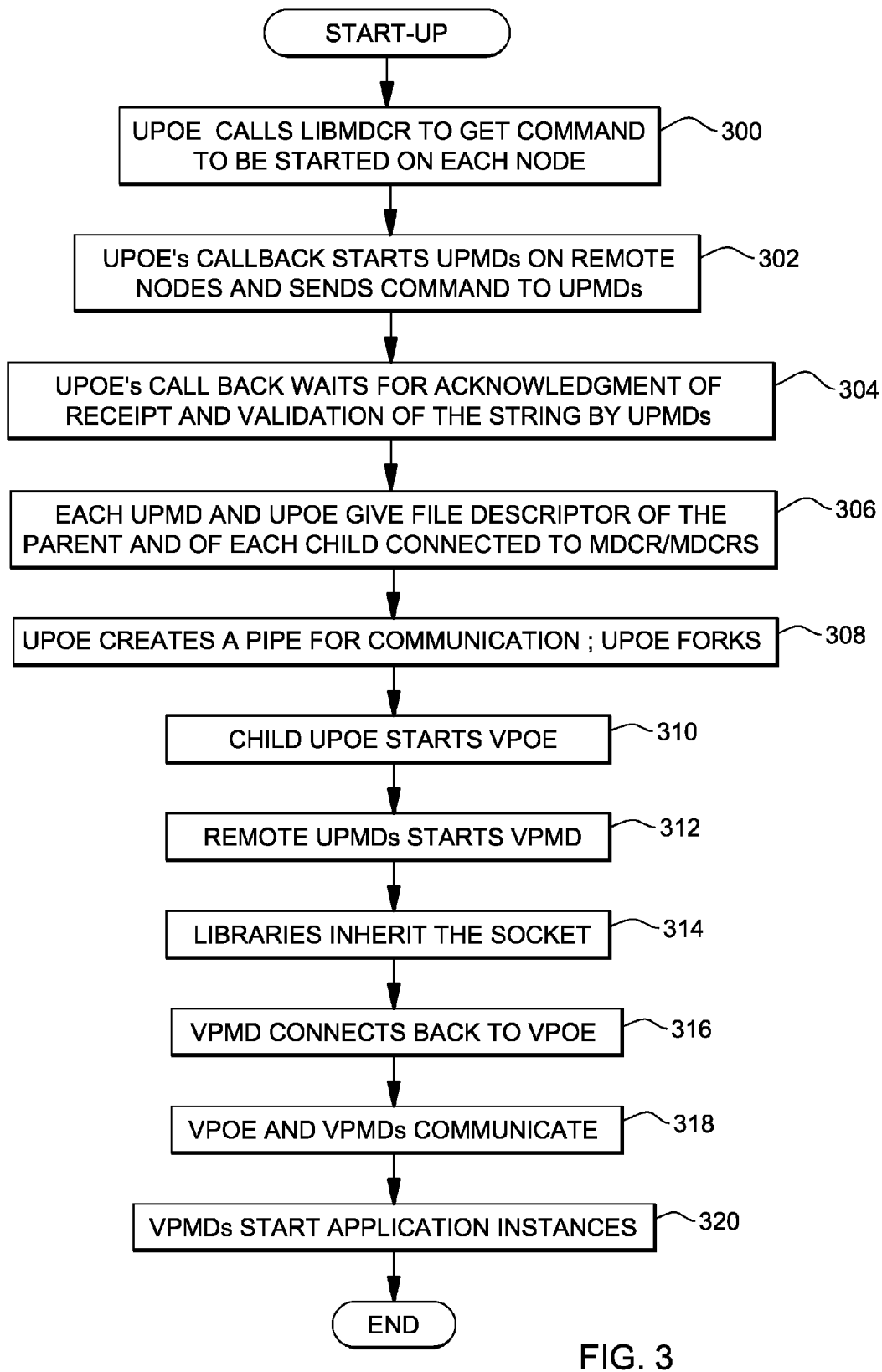
FIG. 3 depicts one embodiment of the logic associated with starting the nodes in which a parallel application is to process, in accordance with an aspect of the present invention.

Referring to FIG. 3, initially, upoe calls libmdcr (e.g., the mdcr_execute( . . . ) function) to get the command (mdcrs string) that is to be started on each node, STEP 300. The upoe's callback (initCB) starts upmds on the different remote nodes (several layers:scalability) and sends the mdcrs string and other information to upmds, STEP 302. Specifically, in one example, upoe starts upmd on the nodes it is directly connected to, and then those nodes start upmd on the nodes they are connected to, etc. That is, the hierarchical structure of the fanout is followed.

The initCB waits for acknowledgement of receipt and validation of the string by the upmds, STEP 304. Note that each parent pmd in the fanout reads the string, calls add_parent/add_child (process used to indicate parent/child) to make the fanout topology available to the mdcrs network, sends the string downstream, and waits for responses from downstream pmds before sending a composite status message upstream.

Each upmd and upoe give the file descriptor of the parent and of each child connected to libmdcr/libmdcrs using mdcrs_add_parent( ) and mdcrs_add_child( ) functions, STEP 306. That is, the add functions provide the relative positive of the process in the hierarchy.

The upoe creates a pipe for communication with its local child, and upoe forks, thereby creating one or more children processes on the node executing upoe, STEP 308. A child upoe starts vpoe (e.g., via a mdcrs_start( . . . ) function), STEP 310. The mdcrs function uses the pipe opened by upoe. The remote upmds, through libmdcrs, starts vpmd (e.g., via a mdcrs_start( . . . ) function), STEP 312. The container creation status is sent upstream by mdcrs to mdcr_execute on the home node. The libraries (libmdcr/libmdcrs) inherit the socket, STEP 314. This one cannot be used any more by upoe/upmd.

The vpmd connects back to vpoe using the well known port, STEP 316. Vpoe and vpmds communicate together, STEP 318, and the vpmds start the application instances, STEP 320. This completes the startup processing.

In response to startup, the parallel application is processing across the nodes on which it is started. During processing, a checkpoint is initiated by a user or automatically. A checkpoint function is called and checkpoint agents of the checkpoint library inform the parallel application to flush messages. The parallel application indicates it is ready for checkpoint, and the checkpoint is taken.

As an example, the user informs (via, e.g., a command) the checkpoint library that a checkpoint is to be taken. The checkpoint library distributes, based on the fanout connectivity structure, that request to checkpoint agents of the checkpoint library executing on the nodes, and each checkpoint agent notifies the local parallel job manager agent that a checkpoint is to be taken. Each checkpoint agent informs the checkpoint library when it wants the checkpoint to happen, and then, the checkpoint library performs the checkpoint on the nodes. Each local parallel job manager agent reports back to the library, which reports to the user.

Figure 4:
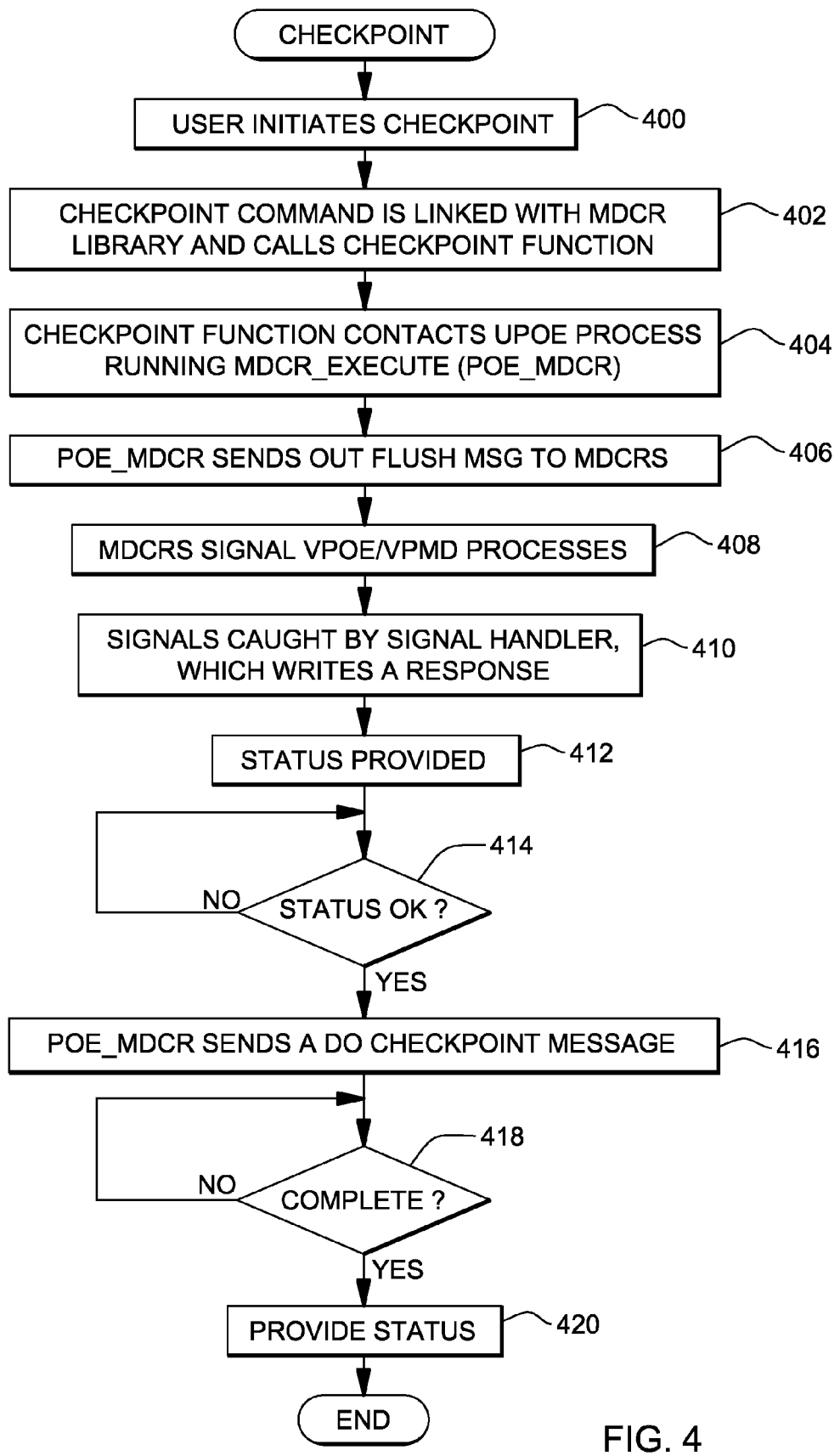
FIG. 4 depicts one embodiment of the logic associated with checkpointing a parallel application, in accordance with an aspect of the present invention.

One embodiment of the logic associated with a particular checkpoint sequence is described with reference to FIG. 4. This logic is performed by one or more nodes of the parallel computing environment.

In one example, a checkpoint is initiated by the user entering a checkpoint command (e.g., poeckpt), giving the real process identifier (PID) of the poe process to be checkpointed (the one outside of the container), STEP 400. The poeckpt command is linked with the mdcr library and calls the mdcr_checkpoint function in libmdcr, STEP 402. The mdcr_checkpoint function contacts the upoe process, which is running mdcr_execute, via the UNIX socket previously opened when the application was started, STEP 404. The instance of mdcr_execute invoked by upoe is abbreviated as poe_mdcr.

The poe_mdcr process sends out a message (e.g., ccp_flush) to all mdcrs instances in the application, STEP 406. These are forwarded by mdcrs, as necessary. The mdcrs instances send a UNIX signal to the vpoe/vpmd processes in the container, STEP 408. The choice of signal is user settable. The signals received by vpoe and vpmd are caught by a signal handler, which writes a response to a pipe that is in the file descriptor set being monitored by vpoe and vpmd, STEP 410. When that file descriptor becomes active, vpoe/vpmd do what is necessary to close all user space connections and any other connections outside of the container, and then calls ccp_ready_for_checkpoint in libccp (a layer of the checkpoint library), blocking themselves there until they are resumed or restarted. MPI tasks trying to do communication are looping on packet retry or packet read.

Libccp sends status to the mdcrs instance outside of the process, and then closes the socket connecting them, STEP 412. The mdcrs forwards status to poe_mdcr.

When all mdcrs instances have reported okay status, INQUIRY 414, the poe_mdcr sends a message (e.g., do_checkpoint) to the mdcrs instances, which causes each container to be dumped to the checkpoint state file (either a local file or a directory of a global file system, such as the General Parallel File System (GPFS), offered by International Business Machines Corporation), STEP 416.

When checkpoint is complete for all the files, INQUIRY 418, status is provided to the user, STEP 420. In one example, if all the checkpoints are successful, then the user-space connections and UNIX socket connections are re-established, and processing resumes. This completes the checkpoint.

The checkpoint files are needed in the event that the parallel application is to be restarted. In one example, restart involves the reconstruction of the mdcr/mdcrs network on a possibly new set of nodes using the same fanout topology as the checkpointed job. Each mdcrs agent reads the checkpoint state file and restarts each container. Communication sockets are re-established during the restart process and the application program is unaware that a checkpoint/restart occurred. User space ports are re-established by the restart callback built into the protocol library before controllers return to the user's application.

Similar to checkpoint, with restart, the restart is initiated by informing the checkpoint library that a restart is to be performed. The checkpoint library distributes, via the topology of the connectivity structure, that request to the agents of the checkpoint library executing on the nodes and each notifies the local parallel job manager agent that a restart is in progress. The parallel job manager agent informs the checkpoint library on each node when the restart is to occur. The checkpoint library performs the restart on all the nodes. Each local agent reports back to the library.

One embodiment of the logic associated with restart is described with reference to FIGS. 5A-5B. This logic is performed by one or more nodes of the parallel computing environment.

Figure 5A:
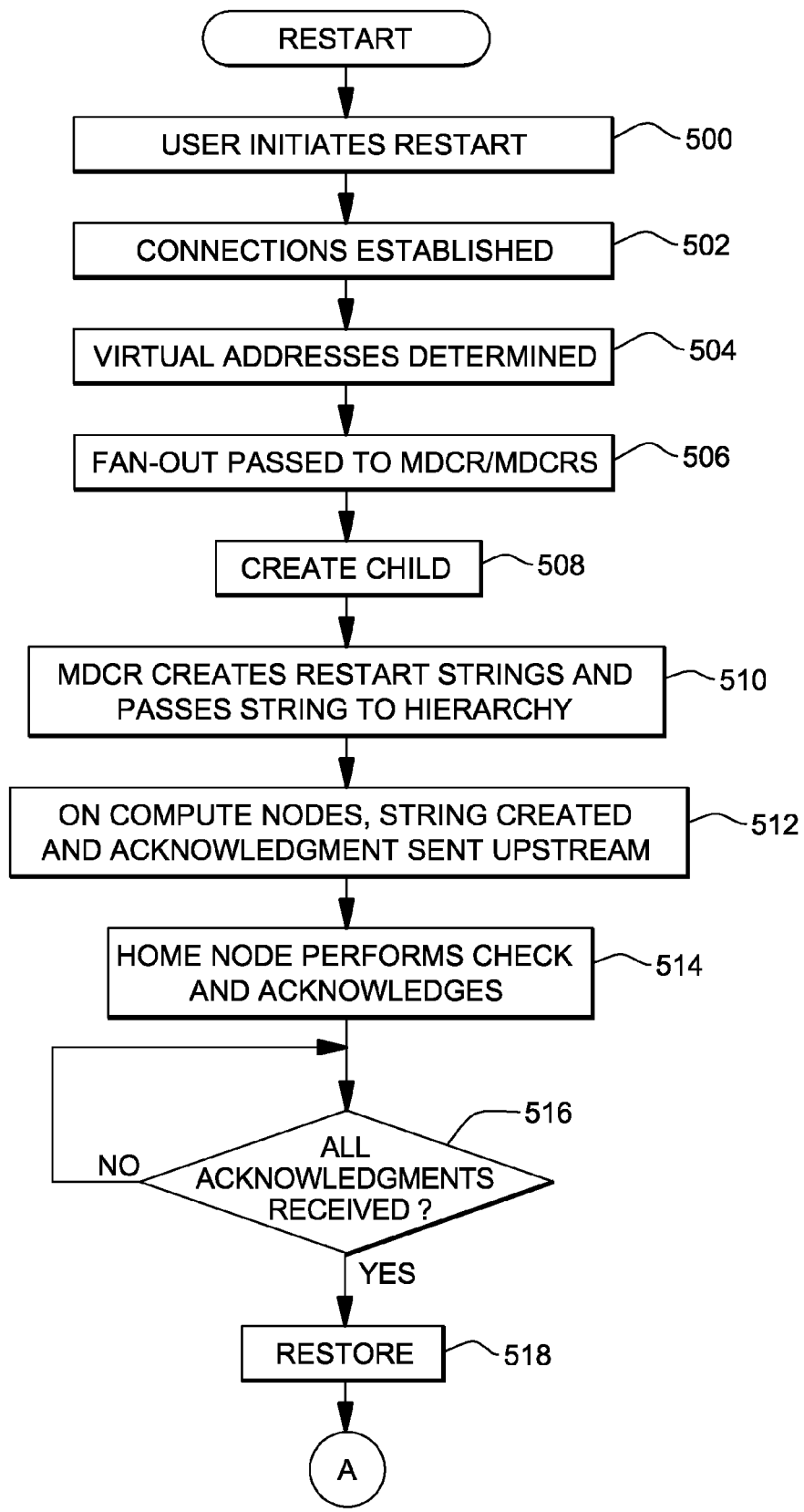
FIGS. 5A-5B depict one embodiment of the logic associated with restarting a parallel application, in accordance with an aspect of the present invention.
Figure 5B:
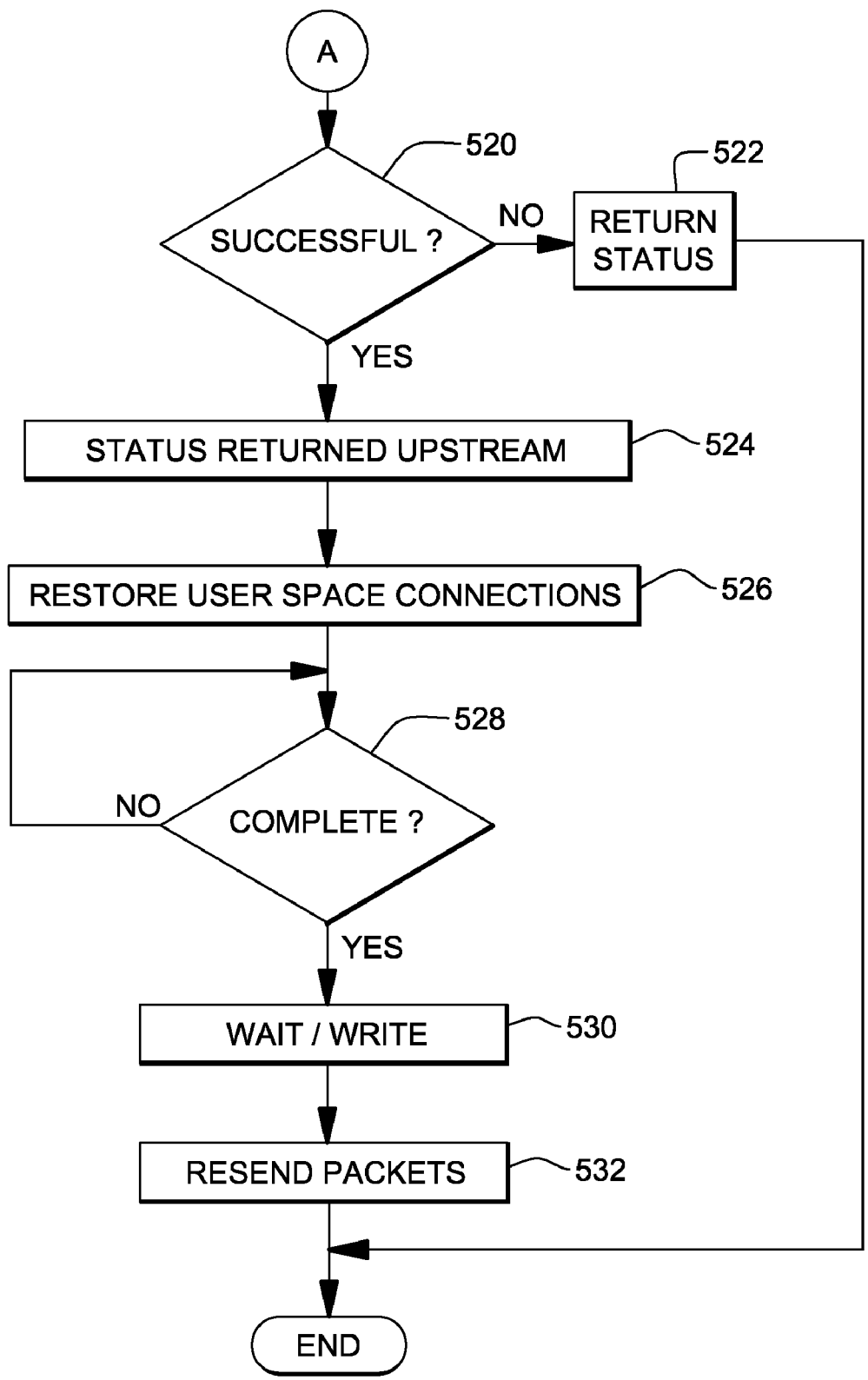

Referring to FIG. 5A, in one example, restart is initiated by, for instance, the user entering poerestart and providing the name of a checkpoint directory and a list of nodes on which to restart, STEP 500. The poerestart reads the saved fanout hierarchy data and establishes the connections to the other nodes, starting upmd on each node, STEP 502. As with startup, poe starts the first level pmds, the first level pmds start the second level pmds, and so forth, based on the fanout connectivity structure.

Further, poerestart contacts the virtual IP (VIP) server (directly or indirectly via a library call) to get the virtual addresses reassigned to the new physical addresses, STEP 504. Again, there may be multiple sets, if MPI/LAPI are using IP protocol for communication.

Poerestart calls the add_child function to pass the fanout directory to mdcr/mdcrs, STEP 506. Poerestart continues to imitate the poe startup, creating a child with pipe connection, and then calling mdcr_restart from the libmdcr library, STEP 508. Mdcr creates the restart strings and invokes the poe-written initCB callback to pass the string to the fanout hierarchy and wait for validity check and acknowledgement, STEP 510.

On the compute nodes, upmd calls mdcrs_restart, which similarly creates a string and invokes the poe-written initCB function to send acknowledgements upstream, STEP 512. The home node performs a similar check and acknowledges, STEP 514. When all acknowledgements have been received, INQUIRY 516, the initCB returns to mdcr, which then sends an execute message to all mdcrs instances, telling them to restore the container from the state file, STEP 518.

If restoration of a container is unsuccessful, INQUIRY 520 (FIG. 5B), status is returned, STEP 522, and processing is complete. Similarly, when a container has been restored successfully, status is returned upstream, STEP 524. Further, restoring the container mounts the virtual addresses to the real addresses on the node, and sends a "reverse ARP (Address Resolution Protocol)" telling the upstream nodes that the hardware address of the node has changed. A message is sent out (e.g., ccp_flush), which causes the signal handlers for vpoe and vpmd in the containers to be activated to restore the user space connections, STEP 526.

When restart has been completed, INQUIRY 528, all processes in the ccp protocol are waiting on a read, and the mdcrs instances perform a write, which causes the tasks to re-establish the user space windows, and to return from the ccp protocol library and resume their normal polling, STEP 530. The task retransmission mechanism starts to resend packets, which may have been lost when checkpoint was signaled, STEP 532. This completes the restart sequence.

At times, during the processing of a parallel application, it is necessary or desirable to move a part of the application from one node to another node. Migration includes moving processes executing on one or more (source) nodes of an application to other nodes (targets). All nodes are told, via the hierarchical path of the fanout structure, to prepare for checkpoint, and to close their user space connections. Each source node is checkpointed and left in a paused state. The mdcr/mdcrs network is modified to substitute the target nodes for the source nodes, and the source node checkpoint files are used to restart the containers on the target nodes. If the restart succeeds, the containers on the source node are killed. Then, all nodes are told to re-establish their connections with the target nodes replacing the source nodes and continue (this may be the same as the restart sequence).

Figure 6A:
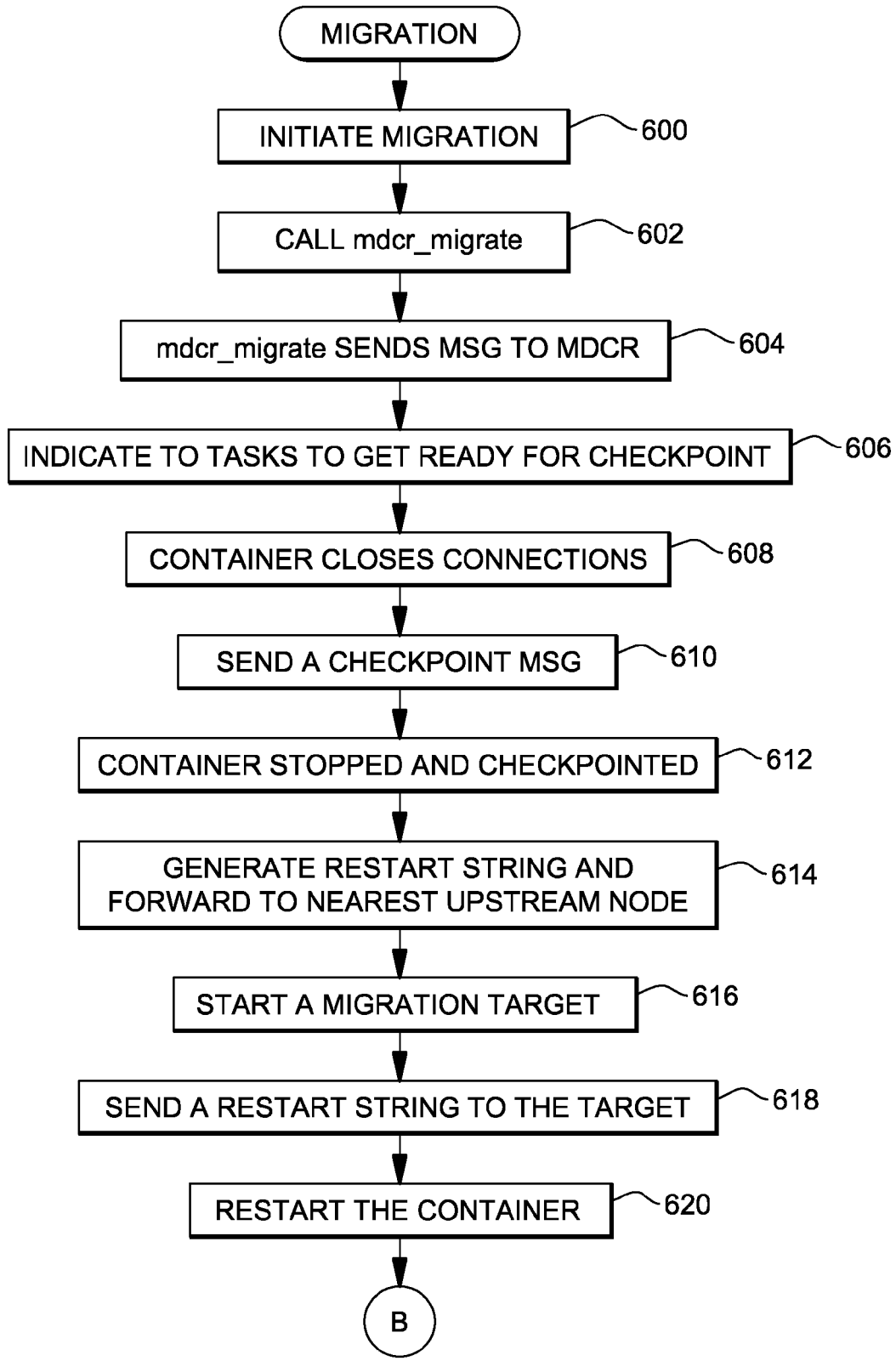
FIGS. 6A-6B depict one embodiment of the logic associated with migrating a portion of a parallel application from one node to another node, in accordance with an aspect of the present invention.

One embodiment of the logic associated with migration is described with reference to FIGS. 6A-6B. In one example, this logic is performed on one or more nodes of the parallel computing environment.

Initially, migration is initiated by a user or system operator entering a command (e.g., poemigrate), identifying the application ID and the source/target migration list, STEP 600. The poemigrate calls mdcr_migrate in libmdcr, STEP 602. The mdcr_migrate sends a message to poe_mdcr (on the home node) using the existing Unix socket, STEP 604.

Poe_mdcr sends a message (e.g., ccp_flush) telling the tasks or processes of the parallel application to get ready for checkpoint, STEP 606. Each container closes its user space connections, as if it were going to be checkpointed, and acknowledges through the hierarchy so that poe_mdcr eventually sees that all the tasks are ready for checkpoint, STEP 608.

Poe_mdcr sends a message (e.g., do_checkpoint) with a list of nodes that are to be checkpointed, STEP 610. In this example, all the nodes get the message, and those that do not need to take action merely acknowledge.

The container of the migration source node is stopped and checkpointed with the pause operation, STEP 612. The mdcrs instance on the migration source node generates an appropriate restart string and forwards it to the nearest upstream node (e.g., in this case poe_mdcr), STEP 614.

Poe_mdcr invokes the poe-written migrateCB, which connects to the migration target node, starting upmd on that node, and telling it that it is a migration target, STEP 616. In one example, it calls add_child for the target node, and the target calls add_parent to provide relative position in the hierarchy.

The migrateCB sends the restart string to the target for validation, STEP 618. The target invokes initCB to return the acknowledgement. The callback is returned, and the migrate function in poe_mdcr sends a go to restart the container on the target node (e.g., in pause mode), STEP 620. Everyone else merely acknowledges.

Figure 6B:
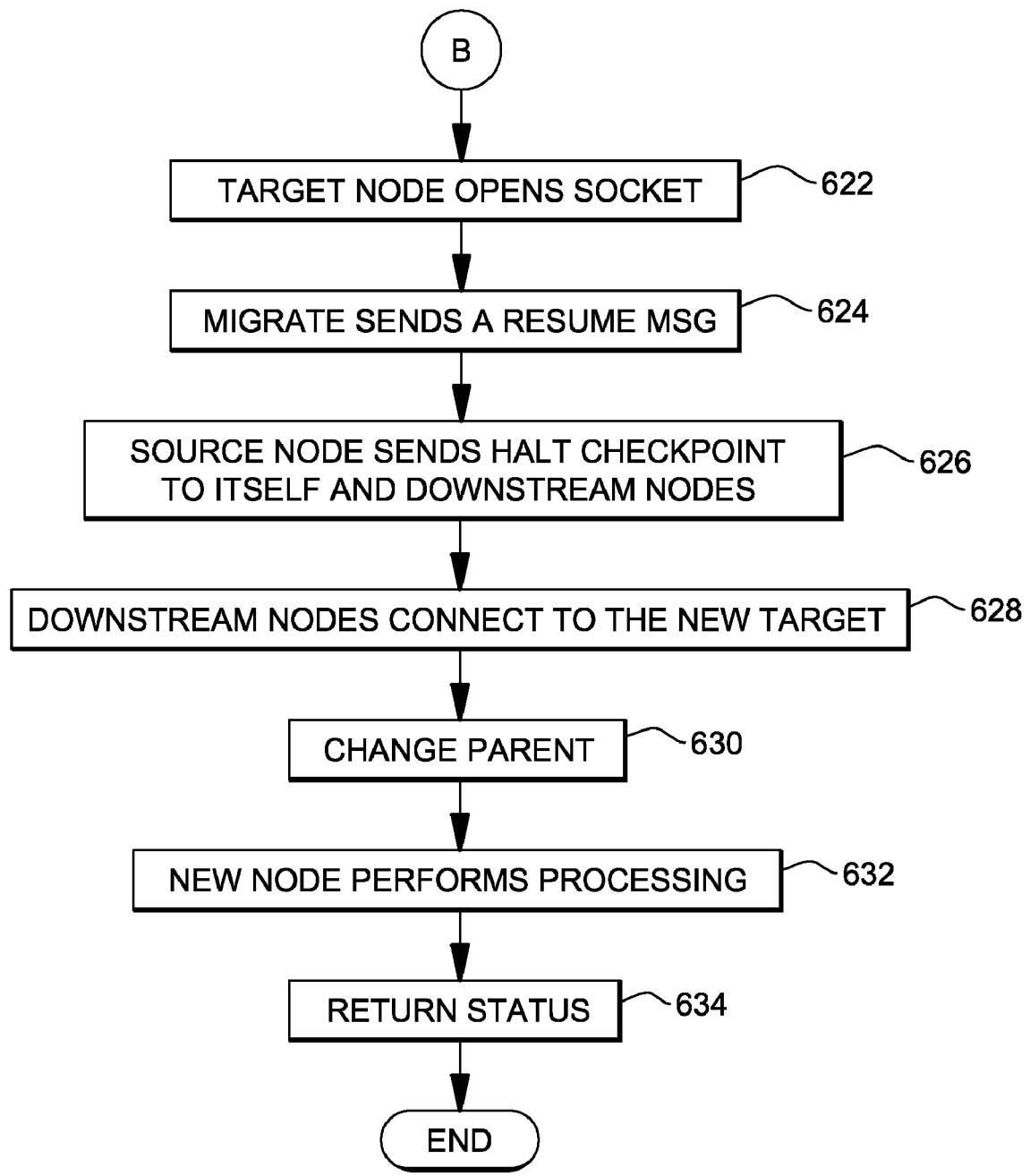

The target node opens a socket for L2 nodes to connect to, and sends its real port upstream, STEP 622 (FIG. 6B).

Poe_mdcr (migrate) sends a resume message to all containers, which causes all the containers (except the migration source node) to be restarted, STEP 624. The resume message also includes the address:port of the new L1 node for use by the L2 nodes which had been communicating with the migration source node.

The migration source node sends a halt_checkpoint to itself and its downstream nodes, STEP 626. The container is stopped, and the downstream node is merely acknowledged. It then sends a disconnect_no_container and waits for downstream nodes (children) to disconnect. Children do not disconnect at this point.

The migration source node sends a connect_new_parent, passing addr:port of the new L1 node to the downstream nodes, STEP 628. The downstream nodes connect to the new target. Temporarily, the downstream nodes have connections to all upstream nodes.

Migration source node sends a change parent causing each L2 downstream node to close its connection to the migration source, STEP 630. When this is complete, the migration source node sends a resume_complete to poe_mdcr, disconnects and exits.

The new node sends a reverse ARP to identify itself as a replacement for the previous node; then poe_mdcr sends a restore message to all, restarting the containers on all the nodes; ccp_restart is sent re-establishing the user space connections on an updated table of windows and the socket between libccp in the container and mdcrs outside the container, STEP 632. Status is returned to indicate that the migration has completed successfully, STEP 634. In an error condition, the migration is aborted. This completes the steps taken for migration.

In the above migration process, Levels 1 and 2 are discussed. However, migration can include additional levels, and the processing of the additional levels is similar to that described above.

Described in detail above is a capability to create migratable containers and to provide a scalable checkpoint/restart capability for parallel applications.

One or more aspects of the present invention can be included in an article of manufacture (e.g., one or more computer program products) having, for instance, computer readable media. The media has therein, for instance, computer readable program code means or logic (e.g., instructions, code, commands, etc.) to provide and facilitate the capabilities of the present invention. The article of manufacture can be included as a part of a computer system or sold separately.

Figure 7:
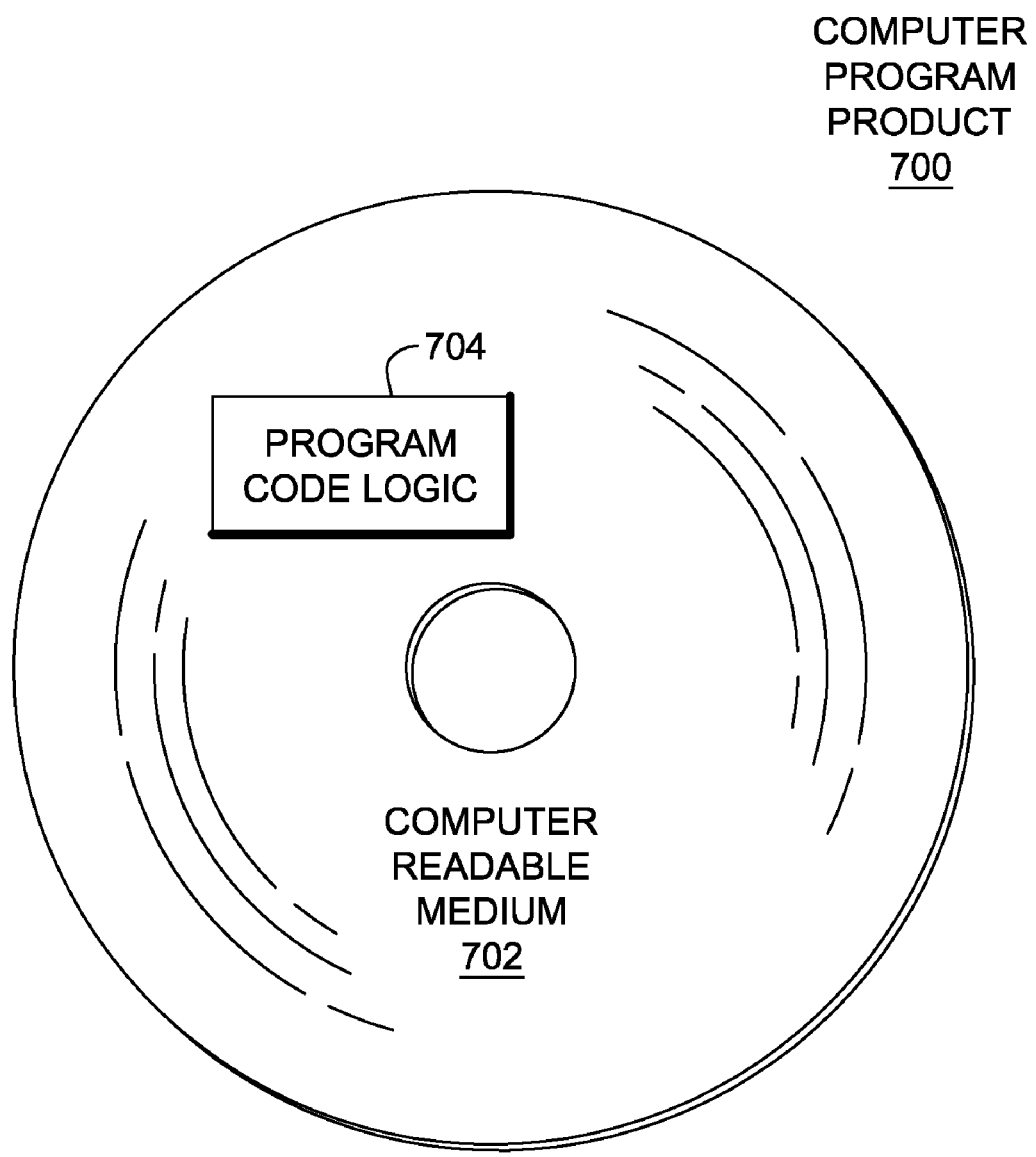
FIG. 7 depicts one embodiment of a computer program product incorporating one or more aspects of the present invention.

One example of an article of manufacture or a computer program product incorporating one or more aspects of the present invention is described with reference to FIG. 7. A computer program product 700 includes, for instance, one or more computer readable media 702 to store computer readable program code means or logic 704 thereon to provide and facilitate one or more aspects of the present invention. The medium can be an electronic, magnetic, optical, electromagnetic, infrared, or semiconductor system (or apparatus or device). Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Moreover, one or more aspects of the present invention can be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer usable medium, in which the computer medium comprises one or more aspects of the present invention. The code in combination with the computer system is capable of performing one or more aspects of the present invention.

Advantageously, a capability is provided that removes control of checkpoint, restart and migration operations from a single master node and shares that responsibility among a plurality of nodes. A hierarchical connectivity structure of nodes is used to perform the checkpoint, restart and/or migration operations.

In one example, a hierarchical fanout structure of managers is built to control the containers on each computing node, which is derived from the fanout structure used to control a large parallel job. As the base fanout structure is built, its connectivity is passed to the checkpoint control library to allow the checkpoint library to maintain and communicate over the structure. The fanout structure is built independent of the checkpoint library in that the checkpoint library is not used to build the fanout structure. Further, the checkpoint library need not build its own connectivity structure, since it uses the fanout structure that has been built. The sequence of events used to checkpoint an entire parallel application, restarted on (possibly) different nodes, or to migrate a portion of the nodes of a running application to a new set of nodes are carefully defined. This makes checkpoint, restart and/or migration of large parallel jobs feasible from a control standpoint.

Advantageously, the fanout structure (i.e., the information or details of the structure) is passed to the checkpoint library, such that the connectivity of the fanout library is shared with the checkpoint library without the overhead and inefficiencies of having the checkpoint library build its own connectivity structure and possibly interfere with the structure. The checkpoint library uses the fanout structure that is passed to it to perform checkpoint, restart, and migrations, as described herein.

Although one example of building a connectivity structure is described above, other implementations may be used without departing from the spirit of the present invention. Further, other types and variations of the fanout structure may be used.

Moreover, although various embodiments are described above, these are only examples. Many variations may exist without departing from the spirit of the present invention. For instance, one or more steps to startup, checkpoint, restart or migrate may be eliminated or performed in a differing order. Further, one or more aspects of the present invention can be used in parallel environments that do not use mdcr. Yet further, one or more aspects of the present invention can be used on nodes that execute operating systems other than AIX® or Linux, and there may be various types of heterogeneous or homogeneous nodes. Further, the number of nodes or levels of the hierarchy depicted herein are only examples, and one or more aspects of the present invention are usable with other hierarchies and hierarchies with more or less levels than that described herein. Further, each level may include more or less nodes than described herein. Even further, although strings and command are referred to, other structures may be used.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Additional details regarding checkpoint/restart of a parallel program, mdcr, migration and other related topics are described in U.S. Pat. No. 6,401,216, entitled "System of Performing Checkpoint/Restart of a Parallel Program," issued Jun. 4, 2002; U.S. Patent Application Publication 2008/0307265 A1, entitled "Method for Managing a Software Process, Method and System for Distribution or for Continuity of Operation in a Multi-Computer Architecture," published Dec. 11, 2008; U.S. Patent Application Publication 2005/0262411 A1, entitled "Migration Method for Software Application in a Multi-Computing Architecture, Method for Carrying Out Functional Continuity Implementing Said Migration Method and Multi-Computing System Provided Therewith," published Nov. 24, 2005; U.S. Patent Application Publication 2007/0234295 A1, entitled "Method for Executing an Application in a Virtual Container Forming a Virtualized Environment Session," published Oct. 4, 2007; and U.S. Pat. No. 7,039,718, entitled "Multiprocess Computer System," issued May 2, 2006, each of which is hereby incorporated herein by reference in its entirety.

As used herein, obtaining, such as obtaining a connectivity structure, includes receiving, being provided, having, etc. the structure and/or information or details describing the structure.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer program product to facilitate processing within a parallel computing environment, said computer program product comprising:
   a storage medium readable by at least one processing node and storing instructions for execution by the at least one processing node for performing a method comprising:
      obtaining, by a checkpoint library of the parallel computing environment, a fanout connectivity structure, said fanout connectivity structure built independent of the checkpoint library and defining a hierarchical topology of a plurality of nodes to be used in performing one or more processing operations for a parallel application executing in the parallel computing environment; and
      using, by the checkpoint library, at least multiple nodes of the plurality of nodes of the fanout connectivity structure and a defined sequence of events to perform one or more processing operations, wherein in performing a processing operation communication between nodes of the at least multiple nodes follows the hierarchical topology defined by the fanout connectivity structure.

2. The computer program product of claim 1, wherein a plurality of nodes, rather than a single master node, are used to control processing of the one or more processing operations.

3. The computer program product of claim 1, wherein the one or more processing operations comprise at least one of a checkpoint operation, a restart operation or a migration operation.

4. The computer program product of claim 1, wherein the one or more processing operations comprises a checkpoint operation, and wherein performing the checkpoint operation comprises:
   invoking a checkpoint function for the parallel application;
   indicating to a plurality of processes of the parallel application by a plurality of checkpoint agents of the checkpoint library to prepare for a checkpoint, wherein the indicating follows the fanout connectivity structure to hierarchically notify the plurality of processes;
   providing an indication by the parallel application that it is ready for the checkpoint; and
   taking the checkpoint.

5. The computer program product of claim 4, wherein the providing the indication comprises following, by the plurality of processes, the fanout connectivity structure in reverse order to provide the ready indication.

6. The computer program product of claim 1, wherein the one or more processing operations comprises a restart operation, and wherein performing the restart operation comprises:
   invoking a restart function for the parallel application;
   indicating to a plurality of processes of the parallel application by a plurality of checkpoint agents of the checkpoint library to prepare for restart, wherein the indicating follows the fanout connectivity structure to hierarchically notify the plurality of processes;
   providing an indication by the parallel application that it is ready for restart; and
   restarting the parallel application using a checkpoint file created in response to checkpointing the parallel application.

7. The computer program product of claim 1, wherein the one or more processing operations comprises a migration operation, and wherein performing the migration operation comprises:
   invoking a migration function for the parallel application;
   taking a checkpoint of the parallel application on selected nodes defined in the fanout connectivity structure;
   starting a target node that is to receive a portion of the parallel application being moved from a source node;
   updating the fanout connectivity structure to reflect the target node; and
   restarting the portion of the parallel application on the target node using the checkpoint.

8. The computer program product of claim 1, further comprising preparing the at least multiple nodes, using the fanout connectivity structure, to be able to participate in performing the one or more processing operations.

9. The computer program product of claim 8, wherein the preparing comprises:
   starting, by a parallel job manager, a plurality of parallel job manager agents on a plurality of nodes based on the fanout connectivity structure, said starting including informing the plurality of parallel job manager agents of other parallel job manager agents to be started by the one or more plurality of parallel job manager agents;
   initiating, by the plurality of parallel job manager agents the one or more other parallel job manager agents, wherein the initiating includes informing the one or more other parallel job manager agents of one or more additional parallel job manager agents to be started, if any; and
   repeating the initiating until the parallel job manager agents specified in the fanout connectivity structure are started.

10. A computer-implemented method of facilitating processing within a parallel computing environment, said computer-implemented method comprising:
   obtaining, by a checkpoint library of the parallel computing environment, a fanout connectivity structure, said fanout connectivity structure built independent of the checkpoint library and defining a hierarchical topology of a plurality of nodes to be used in performing one or more processing operations for a parallel application executing in the parallel computing environment; and
   using, by the checkpoint library, at least multiple nodes of the plurality of nodes of the fanout connectivity structure and a defined sequence of events to perform one or more processing operations, wherein in performing a processing operation communication between nodes of the at least multiple nodes follows the hierarchical topology defined by the fanout connectivity structure.

11. The computer-implemented method of claim 10, wherein the one or more processing operations comprises a checkpoint operation, and wherein performing the checkpoint operation comprises:
   invoking a checkpoint function for the parallel application;
   indicating to a plurality of processes of the parallel application by a plurality of checkpoint agents of the checkpoint library to prepare for a checkpoint, wherein the indicating follows the fanout connectivity structure to hierarchically notify the plurality of processes;
   providing an indication by the parallel application that it is ready for the checkpoint; and
   taking the checkpoint.

12. The computer-implemented method of claim 10, wherein the one or more processing operations comprises a restart operation, and wherein performing the restart operation comprises:
   invoking a restart function for the parallel application;
   indicating to a plurality of processes of the parallel application by a plurality of checkpoint agents of the checkpoint library to prepare for restart, wherein the indicating follows the fanout connectivity structure to hierarchically notify the plurality of processes;
   providing an indication by the parallel application that it is ready for restart; and
   restarting the parallel application using a checkpoint file created in response to checkpointing the parallel application.

13. The computer-implemented method of claim 10, wherein the one or more processing operations comprises a migration operation, and wherein performing the migration operation comprises:
   invoking a migration function for the parallel application;
   taking a checkpoint of the parallel application on selected nodes defined in the fanout connectivity structure;
   starting a target node that is to receive a portion of the parallel application being moved from a source node;
   updating the fanout connectivity structure to reflect the target node; and
   restarting the portion of the parallel application on the target node using the checkpoint.

14. The computer-implemented method of claim 10, further comprising preparing the at least multiple nodes, using the fanout connectivity structure, to be able to participate in performing the one or more processing operations, wherein the preparing comprises:
   starting, by a parallel job manager, a plurality of parallel job manager agents on a plurality of nodes based on the fanout connectivity structure, said starting including informing the plurality of parallel job manager agents of other parallel job manager agents to be started by the one or more plurality of parallel job manager agents;
   initiating, by the plurality of parallel job manager agents the one or more other parallel job manager agents, wherein the initiating includes informing the one or more other parallel job manager agents of one or more additional parallel job manager agents to be started, if any; and
   repeating the initiating until the parallel job manager agents specified in the fanout connectivity structure are started.

15. A system of facilitating processing within a parallel computing environment, said system comprising:
   a memory; and
   at least one processor in communications with the memory, wherein the system is capable of performing a method comprising:
      obtaining, by a checkpoint library of the parallel computing environment, a fanout connectivity structure, said fanout connectivity structure built independent of the checkpoint library and defining a hierarchical topology of a plurality of nodes to be used in performing one or more processing operations for a parallel application executing in the parallel computing environment; and
      using, by the checkpoint library, at least multiple nodes of the plurality of nodes of the fanout connectivity structure and a defined sequence of events to perform one or more processing operations, wherein in performing a processing operation communication between nodes of the at least multiple nodes follows the hierarchical topology defined by the fanout connectivity structure.

16. The system of claim 15, wherein the one or more processing operations comprises a checkpoint operation, and wherein performing the checkpoint operation comprises:
   invoking a checkpoint function for the parallel application;
   indicating to a plurality of processes of the parallel application by a plurality of checkpoint agents of the checkpoint library to prepare for a checkpoint, wherein the indicating follows the fanout connectivity structure to hierarchically notify the plurality of processes;
   providing an indication by the parallel application that it is ready for the checkpoint; and
   taking the checkpoint.

17. The system of claim 15, wherein the one or more processing operations comprises a restart operation, and wherein performing the restart operation comprises:
   invoking a restart function for the parallel application;
   indicating to a plurality of processes of the parallel application by a plurality of checkpoint agents of the checkpoint library to prepare for restart, wherein the indicating follows the fanout connectivity structure to hierarchically notify the plurality of processes;
   providing an indication by the parallel application that it is ready for restart; and
   restarting the parallel application using a checkpoint file created in response to checkpointing the parallel application.

18. The system of claim 15, wherein the one or more processing operations comprises a migration operation, and wherein performing the migration operation comprises:
   invoking a migration function for the parallel application;
   taking a checkpoint of the parallel application on selected nodes defined in the fanout connectivity structure;
   starting a target node that is to receive a portion of the parallel application being moved from a source node;
   updating the fanout connectivity structure to reflect the target node; and
   restarting the portion of the parallel application on the target node using the checkpoint.

19. The system of claim 15, further comprising preparing the at least multiple nodes, using the fanout connectivity structure, to be able to participate in performing the one or more processing operations.

20. The system of claim 19, wherein the preparing comprises:

starting, by a parallel job manager, a plurality of parallel job manager agents on a plurality of nodes based on the fanout connectivity structure, said starting including informing the plurality of parallel job manager agents of other parallel job manager agents to be started by the one or more plurality of parallel job manager agents;

initiating, by the plurality of parallel job manager agents the one or more other parallel job manager agents, wherein the initiating includes informing the one or more other parallel job manager agents of one or more additional parallel job manager agents to be started, if any; and repeating the initiating until the parallel job manager agents specified in the fanout connectivity structure are started.

\* \* \* \* \*